(12) United States Patent
Jiang et al.

(10) Patent No.: US 10,012,149 B2
(45) Date of Patent: Jul. 3, 2018

(54) TWO DEGREE-OF-CONSTRAINT SEMI-FUSIBLE GEARBOX MOUNTING LINK

(71) Applicant: Hamilton Sundstrand Corporation, Charlotte, NC (US)

(72) Inventors: Yiwei Jiang, Rockford, IL (US); Michael R. Blewett, Stillman Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 75 days.

(21) Appl. No.: 15/069,399

(22) Filed: Mar. 14, 2016

(65) Prior Publication Data

US 2017/0260907 A1     Sep. 14, 2017

(51) Int. Cl.
| F16H 57/02 | (2012.01) |
| F02C 7/32 | (2006.01) |
| F16H 57/025 | (2012.01) |

(52) U.S. Cl.
CPC ............. *F02C 7/32* (2013.01); *F16H 57/025* (2013.01); *F05D 2260/30* (2013.01); *F05D 2260/311* (2013.01); *F05D 2260/96* (2013.01)

(58) Field of Classification Search
CPC ...... F02C 7/32; F16H 57/025; F05D 2260/30; F05D 2260/311; F05D 2260/96
See application file for complete search history.

(56) References Cited

U.S. PATENT DOCUMENTS

| 4,500,054 A | 2/1985 | Osborn |
| 6,212,974 B1 | 4/2001 | Van Duyn |
| 2004/0216461 A1 | 11/2004 | Wallace et al. |
| 2011/0239660 A1 | 10/2011 | Suciu et al. |
| 2013/0180262 A1 | 7/2013 | Duong |
| 2014/0127000 A1 | 5/2014 | Abousleiman et al. |

(Continued)

FOREIGN PATENT DOCUMENTS

| EP | 1010878 A2 | 6/2000 |
| WO | WO2014/100817 A1 | 6/2014 |

OTHER PUBLICATIONS

Extended European Search Report for EP Application No. 17160733.6, dated Jul. 24, 2017, 9 pages.

*Primary Examiner* — Vicky A Johnson
(74) *Attorney, Agent, or Firm* — Kinney & Lange, P.A.

(57) ABSTRACT

A gearbox mounting link between a gas turbine engine structure and a gearbox mounting location comprises an engine attachment piece rotatably secured to the gas turbine engine structure. The engine attachment piece comprises first and second plates extending in parallel planes and separated by a gap having a gap width. A gearbox attachment piece is situated between the parallel plates, and is secured to the gearbox. A breakable primary retention fastener extends snugly through the parallel plates and the gearbox attachment piece, thereby rigidly retaining the gearbox with respect to the gas turbine engine in two degrees of freedom so long as the breakable primary retention fastener remains intact. A durable secondary retention fastener extending snugly through the parallel plates, and extends with clearance through the gearbox attachment piece via an oversized fastener passage, thereby constraining the gearbox attachment piece in the event that the breakable primary retention fastener breaks.

14 Claims, 3 Drawing Sheets

(56) References Cited

U.S. PATENT DOCUMENTS

2014/0130628 A1     5/2014    Abousleiman et al.
2014/0314546 A1*   10/2014   Davis .................... F01D 21/045
                                                                415/124.1

* cited by examiner

TWO DEGREE-OF-CONSTRAINT SEMI-FUSIBLE GEARBOX MOUNTING LINK

BACKGROUND

The present invention relates generally support structures, and more particularly to a mounting link between an engine structure and an attached structure such as an auxiliary gearbox.

Aircraft gas turbine auxiliary gearboxes are expected to withstand a variety of loads, from routine vibrational loads to sudden or extreme shocks caused by hard landings. The most extreme loads come from so-called "blade-off" events, when blades of the engine detach due to impacts or the like, causing severe shocks and often major damage to the working engines. Blade-off event loads are extremely unpredictable, but can be more than an order of magnitude stronger than any other sudden or extreme shock gas turbine engines are expected to experience, such as impacts due to hard landings. Extreme loads can cause damage to the gearbox itself, as well as to attached peripheral systems driven by the gearbox. In addition, extreme loads that damage or disconnect parts of the gearbox from the engine can result in potentially dangerous oil leakages. For all of these reasons conventional gearboxes and gearbox connections are constructed to rigidly withstand all anticipated loads.

SUMMARY

In one aspect, the present invention is directed toward a gearbox mounting link between a gas turbine engine structure and a gearbox mounting location comprises an engine attachment piece rotatably secured to the gas turbine engine structure. The engine attachment piece comprises first and second plates extending in parallel planes and separated by a gap having a gap width. A gearbox attachment piece is situated between the parallel plates, and is secured to the gearbox. A breakable primary retention fastener extends snugly through the parallel plates and the gearbox attachment piece, thereby rigidly constraining the gearbox with respect to the gas turbine engine in two degrees of freedom so long as the breakable primary retention fastener remains intact. A durable secondary retention fastener extending snugly through the parallel plates, and extends with clearance through the gearbox attachment piece via an oversized fastener passage, thereby constraining the gearbox attachment piece in the event that the breakable primary retention fastener breaks.

In another aspect, the present invention is directed toward a method of attaching a gearbox to a gas turbine engine structure. An engine attachment piece comprising first and second parallel plates is secured to the gas turbine engine structure, and a gearbox attachment piece comprising a single plate situated between the parallel plates is secured to the gearbox. The gearbox attachment piece is rigidly attached to the engine attachment piece via a breakable primary retention fastener extending snugly through the parallel plates and the gearbox attachment piece, thereby rigidly retaining the gearbox with respect to the gas turbine engine in two degrees of freedom so long as the breakable primary retention fastener remains intact. A durable secondary retention fastener is snugly inserted through the parallel plates, with clearance through the gearbox attachment piece via an oversized fastener passage.

The present summary is provided only by way of example, and not limitation. Other aspects of the present disclosure will be appreciated in view of the entirety of the present disclosure, including the entire text, claims, and accompanying figures.

Figure 1:
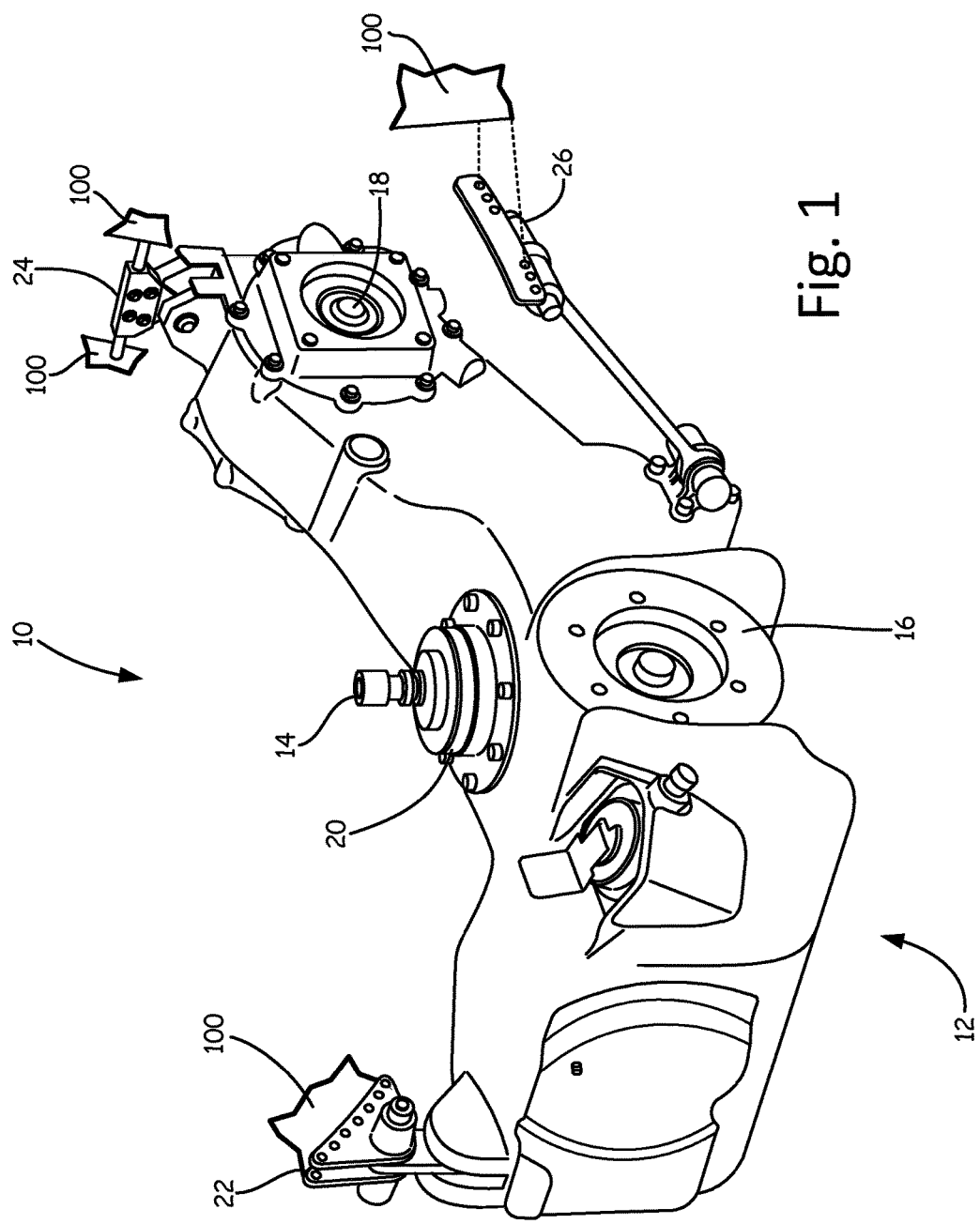
FIG. 1 is a perspective view of an auxiliary gearbox for a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention connects an engine to a gearbox via a mounting link. This mounting link includes a two-sided engine attachment piece, and a gearbox attachment piece snugly secured between sides of the engine attachment piece. The engine attachment piece connects rotatably to an engine mounting location via posts, and the gearbox attachment piece connects to the gearbox via a fastener hole. The engine attachment piece and the gearbox attachment piece are secured rigidly together through two degrees of freedom by breakable fasteners that pass tightly through a primary fastener passage of the gearbox attachment piece. These breakable fasteners shear under extreme loads, but the gearbox attachment piece remains loosely secured in at least one of the two degrees of freedom via durable secondary retention pins that pass through wider secondary fastener passages.

FIG. 1 is a perspective view of gearbox assembly 10, which includes gearbox 12 and supporting elements sufficient to secure gearbox 12 with respect to engine 100. Engine 100 is depicted only schematically, and can, for example, be an aircraft gas turbine engine with a structural engine case, or another engine component to which gearbox 12 is secured. Gearbox assembly 10 includes driveshaft connection 14, peripheral load connections 16 and 18, seal 20, and mounting links 22, 24, and 26. Gearbox 12 can, for example, be an auxiliary gearbox disposed to transmit torque from engine 100 to a variety of peripheral loads not directly related to operation of engine 100 or to propulsion (e.g. to a generator or air circulation system).

Driveshaft connection 14 attaches to a shaft of engine 100 for torque transmission. Peripheral load connections 16 and 18 are two illustrative auxiliary driveshaft connection points for attachment of peripheral loads to gearbox 12. Peripheral loads can include any systems driven by, but not included within, engine 100, including but not limited to air circulation systems and electrical generators. Although only two peripheral load connections 16 and 18 are depicted in FIG. 1, gearbox 12 can more generally support any number and location of peripheral load connections.

Seal 20 and mounting links 22, 24, and 26 collectively constrain gearbox 12 with respect to gas turbine engine structure 100 in all six translational and rotational degrees of freedom, without overconstraining gearbox 12. Seal 20 can, for example, be a spigot-type annular seal that constrains gearbox 12 in two degrees of freedom corresponding to the normal basis of the reference plane on which seal 20 lies. In the depicted embodiment, mounting links 22 and 26 each provide a single independent degree of constraint, while mounting link 24 provides two more independent degrees of constraint. More generally, the collection of all linkages connecting gearbox 12 to engine 100 (including seal 20, as well as provides a total of six independent constraints on the translational and rotational freedom of gearbox 12 with respect to engine 100. In alternative embodiments, these constraints can be distributed about more or fewer separate linkages. The independence of these constraints prevents overconstraint (e.g. two links constraining the same degree of freedom) that would necessitate tighter tolerances and could increase damage done to the gearbox and/or the linkages in the event of severe impacts. The locations and number of degrees of freedom constrained by each linkage may vary across different embodiments, so long as the collection of all linkages constrains all six degrees of freedom without significantly overconstraining any.

Figure 2:
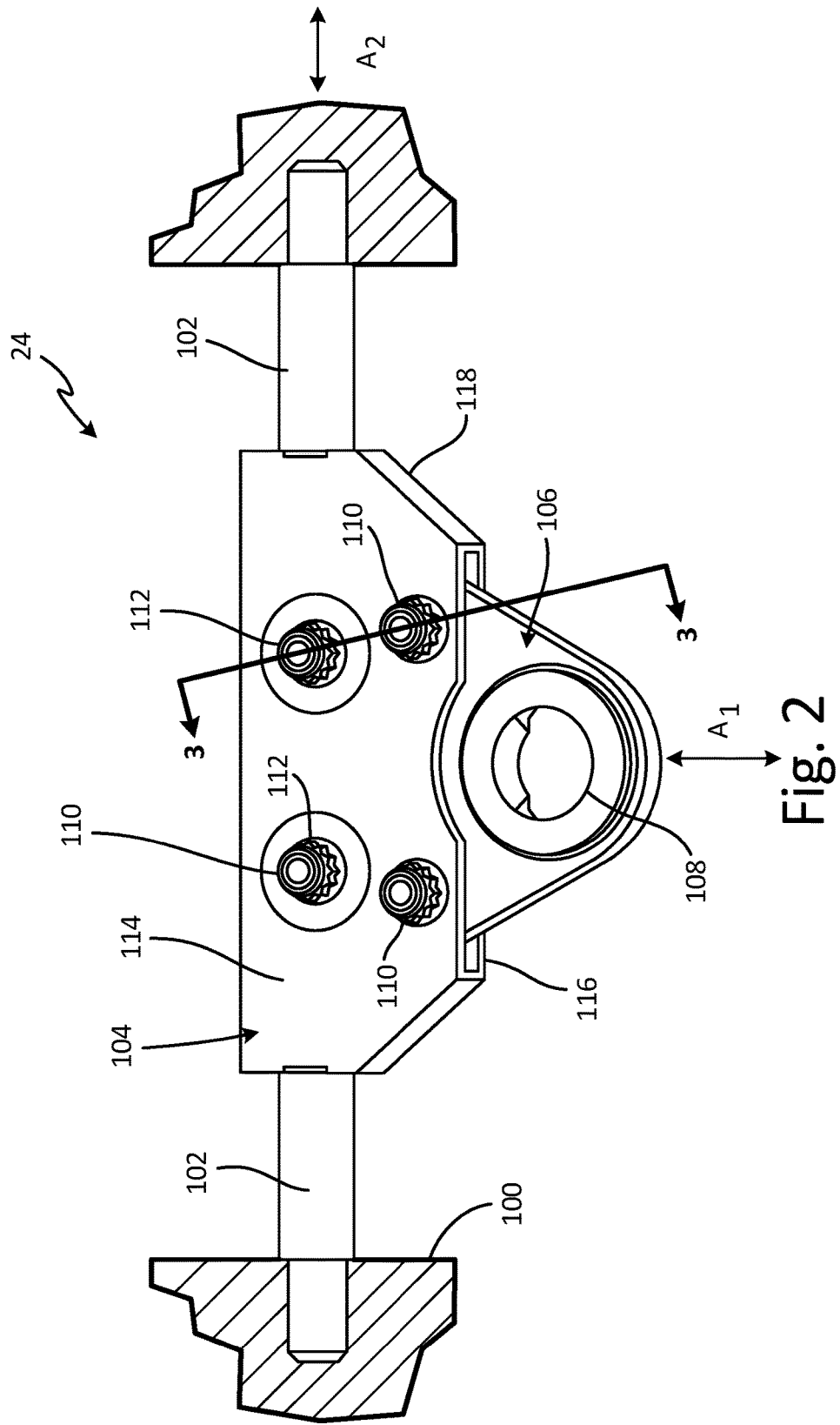
FIG. 2 is a perspective view of a mounting link between the gas turbine engine and the auxiliary gearbox.

FIG. 2 is a perspective view of mounting link 24, illustrating engine 100, posts 102, engine attachment piece 104, gearbox attachment piece 106, gearbox connection 108, primary retention fastener 110, secondary retention fastener 112, engine attachment plates 114 and 116, and plate connecting sections 118. Mounting link 24 is a support structure disposed between gearbox 12 and engine 100 to constrain movement of gearbox 12 relative to engine 100 in two translational degrees of freedom defined by axes $A_1$ and $A_2$, in the plane of FIG. 2.

Posts 102 attach to engine 100 (herein only represented schematically), e.g. by inserting into bores or interfacing with bearings in a rotatable fashion. Posts 102 extend along axis $A_2$, and are connected to engine attachment piece 104. Posts 102 permit engine attachment piece 104 to rotate about axis $A_2$, but do not permit engine attachment piece 104 to translate along axes $A_1$ or $A_2$. Engine attachment piece 104 is a retention structure extending between posts 102, and comprising engine attachment plates 114 and 116 connected by plate connecting sections 118. Engine attachment plates 114 and 116 are parallel plates extending primarily in the plane defined by axes $A_1$ and $A_2$, and in the illustrated embodiment have an irregular hexagonal perimeter shape. Connecting sections 118 can extend substantially perpendicular to engine attachment plates 114 and 116. Engine attachment plates 114 and 116 bracket and abut gearbox attachment piece 106, a planar element extending substantially parallel to engine attachment plates 114 and 116, and including gearbox connection 108. Gearbox connection 108 is an attachment element for connecting gearbox attachment piece 106 to gearbox 12 (see FIG. 1), and can, for example, be a passage disposed to receive a bolt or bearing. In some embodiments, gearbox connection 108 is a bearing face disposed to receive a spherical attachment bearing of gearbox 12.

In at least some embodiments, engine attachment plates 114 and 116, and connecting section 118, are formed integrally and monolithically with posts 102. Engine attachment piece 104 and gearbox attachment piece 106 can, for example, be formed of steel. Engine attachment plates 114 and 116 receive and anchor primary retention fasteners 110 and secondary retention fasteners 112. Primary and secondary retention fasteners 110 and 112, respectively, can for example be pins, bolts, or pegs extending through engine attachment plate 116, through gearbox attachment piece 106, and at least partially through or into engine attachment plate 114. In the illustrated embodiment, primary and secondary retention fasteners 110 and 112 extend fully through both engine attachment plates 114 and 116. Although FIG. 2 depicts two primary retention fasteners 110 and two secondary retention fasteners 112, alternative embodiments may include a larger number of retention fasteners. In the illustrated embodiment, secondary retention fasteners 112 are situated along axis $A_2$, while primary retention fasteners 110 are situated generally opposite secondary retention fasteners 112 from engine 100.

Primary and secondary retention fasteners 110 and 112 retain gearbox attachment piece 106 with respect to engine attachment piece 104, and therefore gearbox 12 with respect to engine 100. Primary retention fasteners 110 rigidly constrain gearbox attachment piece 106 with respect to engine attachment piece 104 during normal operating conditions. Under extreme loads, however, primary retention fasteners 110 are configured to shear or otherwise break. Secondary retention fasteners 112 do not transmit loads between engine attachment piece 104 and gearbox attachment piece 106 during normal operating conditions, but in the event of a load or shock sufficient to break primary retention fasteners 110, secondary retention fasteners 112 retain gearbox attachment piece 106 with respect to engine attachment piece 104 as a backup, in a looser (i.e. less rigid) connection with increased mechanical play, as described in greater detail with respect to FIG. 3. This increased mechanical play allows mounting link 24 to retain gearbox 12 loosely even in the event of extreme shock events that could otherwise cause damage to gearbox 12, engine 100, or attached components.

Primary and secondary retention fasteners 110 and 112 can for example be formed of steel. In some embodiments, primary and secondary retention fasteners 110 and 112 can be formed of different materials, such that primary retention fastener 110 is less durable than secondary retention fastener 112. In these and other embodiments, primary and secondary retention fasteners 110 and 112, respectively, can be sized or shaped such that primary retention fastener 110 is less durable than secondary retention fastener 112. Each set of retention fasteners (i.e. primary retention fasteners 110 and secondary retention fasteners 112) separately constrains translation of gearbox 12 with respect to engine 100 along axis $A_1$ and $A_2$, including by rotation of gearbox attachment piece 106 with respect to engine attachment piece 104

Figure 3:
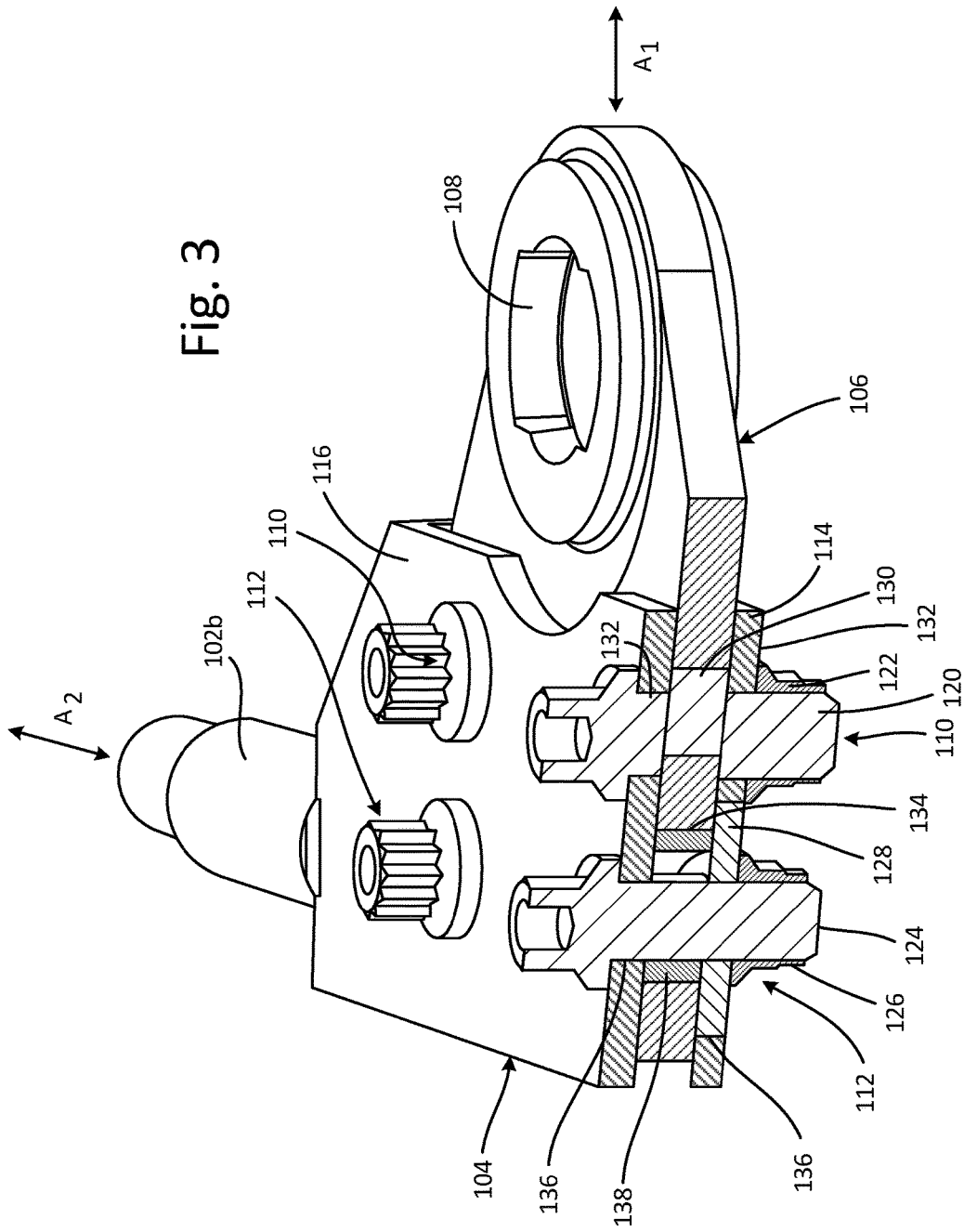
FIG. 3 is a cross-sectional perspective view of the mounting link of FIG. 2.

FIG. 3 is a perspective cross-sectional view of mounting link 24 through section line 3-3 of FIG. 2, and illustrates one post 102, engine attachment piece 104 (with engine attachment plates 114 and 116), gearbox attachment piece 106 (with gearbox connection 108), primary retention fasteners 110, and secondary retention fasteners 112, as described above with respect to FIG. 2. FIG. 3 further illustrates primary fastener bolt 120, primary fastener nut 122, secondary fastener bolt 124, secondary fastener nut 126, secondary fastener washer 128, and primary gearbox attachment passage 130, primary engine attachment passages 132, secondary gearbox attachment passage 134, secondary engine attachment passages 136, and secondary damper 138. In contrast to FIG. 2, FIG. 3 depicts mounting link 24 in its post-shear state, wherein primary retention fasteners 110 are broken and gearbox attachment piece 106 is retained with respect to engine attachment piece 104 by secondary retention fasteners 112.

In the illustrated embodiment, primary retention fastener 110 and secondary retention fastener 112 each comprise bolts (primary fastener bolt 120 and secondary fastener bolt 124, respectively) secured by nuts (primary fastener nut 122 and secondary fastener nut 126, respectively). In alternative embodiments, some or all of primary retention fasteners 110 and secondary retention fasteners 112 can be secured via other means, such as by threading directly into engine attachment plates 114 and/or 116, or by friction fitting. Primary retention fastener 110 passes through primary gearbox attachment passage 130 and engine attachment passages 132, all of which can be snug with primary retention fastener 110 (i.e. have minimal clearance from primary retention fastener 110). Secondary retention fastener 112 passes through secondary gearbox attachment passage 134 and secondary engine attachment passages 136. Analogously to primary engine attachment passages 132, at least one secondary engine attachment passage 136 can be snug with secondary retention fastener 112. In contrast to primary gearbox attachment passage 130, secondary gearbox attachment passage 134 is separated from gearbox attachment plate 106 by clearance gap g. In some embodiments, at least a portion of clearance gap g can be occupied by secondary damper 138, so as to reduce vibration transmission from engine 100 to gearbox 12. Clearance gap g permits a degree of mechanical play between gearbox attachment piece 106 and engine attachment 104 after the destruction of primary retention fasteners 110, thereby attenuating shocks that could otherwise prove damaging to gearbox 12, engine 100, or other attached components. Plate connection sections 118 are spaced apart from gearbox attachment piece 106 by a width at least equal to gap g, and preferably greater, to ensure that gearbox attachment piece 106 does not impact plate connection sections 108 if primary retention fasteners 110 are destroyed.

In some embodiments, engine attachment plates 114 and 116 can tightly abut attachment piece 106. This tightness can be selected based on a thickness of gearbox attachment piece 106 relative to the spacing between engine attachment plates 114 and 116. In some instances, this spacing can be adjusted by tightening secondary fasteners 112. In the illustrated embodiment, secondary fastener washer 128 is disposed within secondary engine attachment passage 136, such that tightening secondary retention fastener 112 applies a clamping force securing gearbox attachment piece 106 against top engine attachment plate 116, thereby providing Coulomb damping via friction between engine attachment plate 116 and gearbox attachment piece 106, only. In alternative embodiments, gearbox attachment piece 106 can, for example, be oversized compared to the spacing between engine attachment plates 114 and 116, and inserted via press fit. In still other alternative embodiments, engine attachment plates 114 and 116 may be biased together towards gearbox attachment piece 106 by tightening secondary fasteners 112. Friction between gearbox attachment piece 106 and engine attachment plates 114 and/or 116 can provide Coulomb damping either in place of or in addition to mechanical damping provided secondary damper 138.

As stated above, primary retention fasteners 110 rigidly connect engine attachment piece 104 to gearbox attachment piece 106. Primary retention fasteners 110 are designed to shear at a known load magnitude corresponding to the maximum structural capability of the gearbox assembly 12, the unfused mount components, and the engine mounting structure 100. This can be accomplished by selecting an appropriately durable width and material for primary retention fasteners 110, or by encouraging shear through primary retention fasteners with grooves or similar geometry. In general, primary retention fasteners 110 must be at least strong enough to withstand peak non-destructive impact loads such as low cycle loads from hard landings and other non-routine but expected shocks. These loads can, for example, reach 10-15 Gs. In at least some embodiments, primary retention fasteners 110 will not break until loads at least 10-25 times higher than expected low cycle loads. Very few loads experienced during aircraft engine operation reach these levels, but shocks due to blade-off events can be high enough to destroy primary retention fasteners 110. By contrast, secondary retention fasteners 110 are sufficiently durable to withstand greater loads, e.g. loads of 100 Gs or more.

Mounting link 24 rigidly constrains translation of gearbox 12 along axes $A_1$ and $A_2$ with respect to engine 100 under ordinary load conditions, including low occurrence, high magnitude shocks such as due to hard landings. Primary retention fasteners 110 fracture in the event of extreme shocks such as from blade-off events, permitting gearbox attachment piece 106 to move with respect to engine attachment piece 104, while still constraining this movement via secondary retention fasteners 112. In this way, mounting link 24 limits or prevents damage that could otherwise be done to gearbox 12 and its attached peripherals by transmitting such extreme loads, while simultaneously helping to prevent gearbox 12 from detaching from engine 100.

Discussion of Possible Embodiments

The following are non-exclusive descriptions of possible embodiments of the present invention.

A gearbox mounting link between a gas turbine engine structure and a gearbox mounting location, the mounting link comprising: an engine attachment piece configured to be rotatably secured to the gas turbine engine structure, the engine attachment piece comprising first and second plates extending in parallel planes and separated by a gap having a gap width; a gearbox attachment piece situated between the parallel plates of the engine attachment piece and configured to be secured to the gearbox; a breakable primary retention fastener extending snugly through the parallel plates and the gearbox attachment piece, thereby rigidly retaining the gearbox with respect to the gas turbine engine in two degrees of freedom so long as the breakable primary retention fastener remains intact; a durable secondary retention fastener extending snugly through the parallel plates, and with clearance through the gearbox attachment piece via an oversized fastener passage, thereby constraining the gearbox attachment piece in the event that the breakable primary retention fastener breaks.

The gearbox mounting link of the preceding paragraph can optionally include, additionally and/or alternatively, any one or more of the following features, configurations and/or additional components:

A further embodiment of the foregoing gearbox mounting link, further comprising engine attachment posts extending symmetrically from the engine attachment piece to secure the engine attachment piece to the gas turbine engine structure.

A further embodiment of the foregoing gearbox mounting link, wherein the engine attachment posts are arranged along a common rotational axis about which the engine attachment piece is rotatable.

A further embodiment of the foregoing gearbox mounting link, wherein the secondary retention fastener is situated perpendicularly through the rotational axis.

A further embodiment of the foregoing gearbox mounting link, wherein the engine attachment posts and the parallel plates form a single integral piece.

A further embodiment of the foregoing gearbox mounting link, further comprising a damper ring disposed at least partially within the oversized fastener passage, between the gearbox attachment piece and the durable secondary retention fastener, and between the parallel plates of the engine attachment piece.

A further embodiment of the foregoing gearbox mounting link, wherein the gearbox attachment piece is clamped in contact with at least one of the parallel plates, such that the gearbox attachment reduces vibration transmission through the gearbox mounting link by Coulomb damping caused by friction between one or both of the parallel plates and the gearbox attachment piece.

A further embodiment of the foregoing gearbox mounting link, further comprising an additional breakable primary retention fastener extending snugly through the parallel plates and the gearbox attachment piece, thereby rigidly retaining the gearbox with respect to the gas turbine engine in two degrees of freedom so long as either breakable primary retention fastener remains intact.

A further embodiment of the foregoing gearbox mounting link, wherein one of the two degrees of freedom falls along a reference axis, and the breakable primary retention fastener and the additional breakable primary retention fastener are disposed symmetrically across the reference axis.

A further embodiment of the foregoing gearbox mounting link, wherein the gearbox attachment piece includes a fastener passage for attachment to the gearbox.

A further embodiment of the foregoing gearbox mounting link, wherein the breakable primary retention fastener is configured to withstand a load at least 15 Gs.

A further embodiment of the foregoing gearbox mounting link, wherein the breakable primary retention fastener is configured to break under a load less than a 100 Gs.

A further embodiment of the foregoing gearbox mounting link, wherein the engine attachment piece and the gearbox attachment piece are formed of steel.

A method of attaching a gearbox to a gas turbine engine structure, the method comprising: rotatably securing an engine attachment piece to the gas turbine engine structure, the engine attachment piece comprising first and second parallel plates; securing a gearbox attachment piece to the gearbox, the gearbox attachment piece comprising a single plate situated between the first and second parallel plates; rigidly attaching the gearbox attachment piece to the engine attachment piece via a breakable primary retention fastener extending snugly through the parallel plates and the gearbox attachment piece, thereby rigidly retaining the gearbox with respect to the gas turbine engine in two degrees of freedom so long as the breakable primary retention fastener remains intact; and inserting a durable secondary retention fastener snugly through at least one of the parallel plates with clearance through the gearbox attachment piece via an oversized fastener passage.

The method of the preceding paragraph can optionally include, additionally and/or alternatively, any one or more of the following features, configurations and/or additional components:

A further embodiment of the foregoing method, further comprising constraining the gearbox attachment piece in at least one of the two degrees of freedom via a durable secondary retention fastener, after the breakable primary retention fastener shears.

A further embodiment of the foregoing method, wherein rotatably attaching the engine attachment piece to the gas turbine engine structure comprises receiving first and second attachment posts extending symmetrically from the engine attachment piece in complementary locations of the engine attachment piece, such that the engine attachment piece is rotatable about an axis extending through and along both attachment posts.

A further embodiment of the foregoing method, further comprising reducing the transmission of vibrational loads from the gas turbine engine structure to the gearbox via a damping ring disposed within the oversized fastener passage, between the parallel plates, and between the durable secondary retention fastener and the gearbox attachment piece.

A further embodiment of the foregoing method, further comprising reducing the transmission of vibrational loads from the gas turbine engine structure to the gearbox via Coulomb damping at a friction interface between the engine attachment piece and the gearbox attachment piece.

An engine assembly comprising: an engine with an engine frame; a gearbox driven by the engine; and a gearbox mounting link securing the gearbox to the engine frame, the gearbox mounting link comprising: an engine attachment piece configured to be rotatably secured to the gas turbine engine structure, the engine attachment piece comprising first and second plates extending in parallel planes and separated by a gap having a gap width; a gearbox attachment piece situated between the parallel plates of the engine attachment piece and configured to be secured to the gearbox; a breakable primary retention fastener extending snugly through the parallel plates and the gearbox attachment piece, thereby rigidly retaining the gearbox with respect to the gas turbine engine in two degrees of freedom so long as the breakable primary retention fastener remains intact; a durable secondary retention fastener extending snugly through the parallel plates, and with clearance through the gearbox attachment piece via an oversized fastener passage, thereby constraining the gearbox attachment piece in the event that the breakable primary retention fastener breaks.

The engine assembly of the preceding paragraph can optionally include, additionally and/or alternatively, any one or more of the following features, configurations and/or additional components:

A further embodiment of the foregoing engine assembly, further comprising a damper ring disposed at least partially within the oversized fastener passage, between the gearbox attachment piece and the durable secondary retention fastener, and between the parallel plates of the engine attachment piece.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gearbox mounting link between a gas turbine engine structure and a gearbox mounting location, the mounting link comprising:
    an engine attachment piece configured to be rotatably secured to the gas turbine engine structure, the engine attachment piece comprising first and second plates extending in parallel planes and separated by a gap having a gap width;
    a gearbox attachment piece situated between the parallel plates of the engine attachment piece and configured to be secured to the gearbox;
    a breakable primary retention fastener extending snugly through the parallel plates and the gearbox attachment piece, thereby rigidly retaining the gearbox with respect to the gas turbine engine in two degrees of freedom so long as the breakable primary retention fastener remains intact;
    a durable secondary retention fastener extending snugly through the parallel plates, and with clearance through the gearbox attachment piece via an oversized fastener passage, thereby constraining the gearbox attachment piece in the event that the breakable primary retention fastener breaks; and
    engine attachment posts extending symmetrically from the engine attachment piece to secure the engine attachment piece to the gas turbine engine structure.

2. The gearbox mounting link of claim 1, wherein the engine attachment posts are arranged along a common rotational axis about which the engine attachment piece is rotatable.

3. The gearbox mounting link of claim 2, wherein the secondary retention fastener is situated perpendicularly through the rotational axis.

4. The gearbox mounting link of claim 1, wherein the engine attachment posts and the parallel plates form a single integral piece.

5. The gearbox mounting link of claim 1, further comprising a damper ring disposed at least partially within the oversized fastener passage, between the gearbox attachment piece and the durable secondary retention fastener, and between the parallel plates of the engine attachment piece.

6. The gearbox mounting link of claim 1, wherein the gearbox attachment piece is clamped in contact with at least one of the parallel plates, such that the gearbox attachment reduces vibration transmission through the gearbox mounting link by Coulomb damping caused by friction between one or both of the parallel plates and the gearbox attachment piece.

7. The gearbox mounting link of claim 1, further comprising an additional breakable primary retention fastener extending snugly through the parallel plates and the gearbox attachment piece, thereby rigidly retaining the gearbox with respect to the gas turbine engine in two degrees of freedom so long as either breakable primary retention fastener remains intact.

8. The gearbox mounting link of claim 7, wherein one of the two degrees of freedom falls along a reference axis, and the breakable primary retention fastener and the additional breakable primary retention fastener are disposed symmetrically across the reference axis.

9. The gearbox mounting link of claim 1, wherein the gearbox attachment piece includes a fastener passage for attachment to the gearbox.

10. The gearbox mounting link of claim 9, wherein the breakable primary retention fastener is configured to withstand a load at least 15 Gs.

11. The gearbox mounting link of claim 9, wherein the breakable primary retention fastener is configured to break under a load less than a 100 Gs.

12. The gearbox mounting link of claim 1, wherein the engine attachment piece and the gearbox attachment piece are formed of steel.

13. An engine assembly comprising:
    an engine with an engine frame;
    a gearbox driven by the engine; and
    a gearbox mounting link securing the gearbox to the engine frame, the gearbox mounting link comprising:
        an engine attachment piece configured to be rotatably secured to the gas turbine engine structure, the engine attachment piece comprising first and second plates extending in parallel planes and separated by a gap having a gap width;
        a gearbox attachment piece situated between the parallel plates of the engine attachment piece and configured to be secured to the gearbox;
        a breakable primary retention fastener extending snugly through the parallel plates and the gearbox attachment piece, thereby rigidly retaining the gearbox with respect to the gas turbine engine in two degrees of freedom so long as the breakable primary retention fastener remains intact;
        a durable secondary retention fastener extending snugly through the parallel plates, and with clearance through the gearbox attachment piece via an oversized fastener passage, thereby constraining the gearbox attachment piece in the event that the breakable primary retention fastener breaks; and
        a damper ring disposed at least partially within the oversized fastener passage, between the gearbox attachment piece and the durable secondary retention fastener, and between the parallel plates of the engine attachment piece.

14. A gearbox mounting link between a gas turbine engine structure and a gearbox mounting location, the mounting link comprising:
    an engine attachment piece configured to be rotatably secured to the gas turbine engine structure, the engine attachment piece comprising first and second plates extending in parallel planes and separated by a gap having a gap width;
    a gearbox attachment piece situated between the parallel plates of the engine attachment piece and configured to be secured to the gearbox;
    a breakable primary retention fastener extending snugly through the parallel plates and the gearbox attachment piece, thereby rigidly retaining the gearbox with respect to the gas turbine engine in two degrees of freedom so long as the breakable primary retention fastener remains intact;

a durable secondary retention fastener extending snugly through the parallel plates, and with clearance through the gearbox attachment piece via an oversized fastener passage, thereby constraining the gearbox attachment piece in the event that the breakable primary retention fastener breaks; and a damper ring disposed at least partially within the oversized fastener passage, between the gearbox attachment piece and the durable secondary retention fastener, and between the parallel plates of the engine attachment piece.

\* \* \* \* \*